Figure 1:
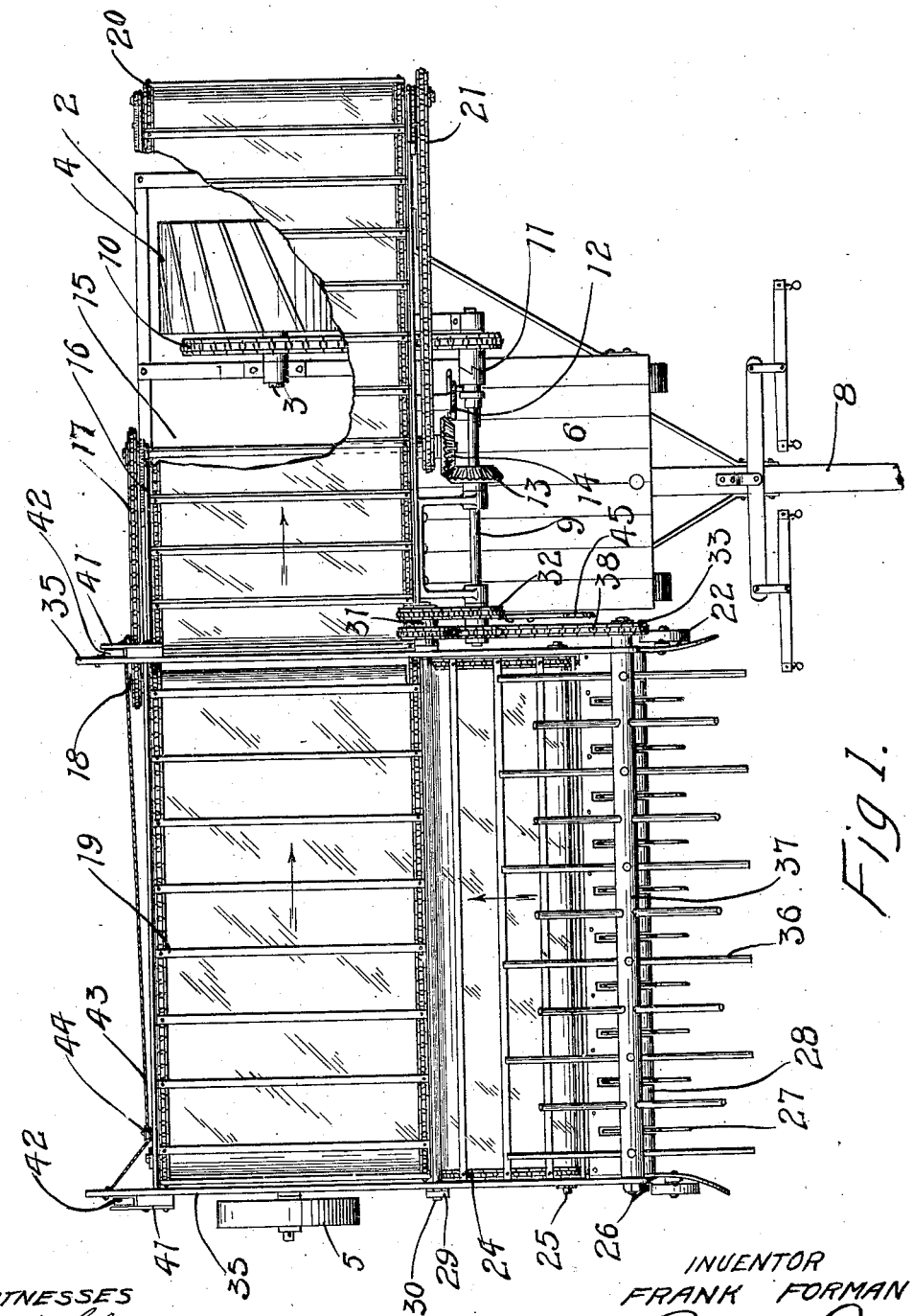

No. 874,950. PATENTED DEC. 31, 1907.
F. FORMAN.
SHOCK AND HAY LOADER.
APPLICATION FILED AUG. 1, 1906.

3 SHEETS—SHEET 1.

WITNESSES
O.M.Walstrom
J.H.Baldwin

INVENTOR
FRANK FORMAN
BY Paul & Paul
HIS ATTORNEYS

No. 874,950.
PATENTED DEC. 31, 1907.
F. FORMAN.
SHOCK AND HAY LOADER.
APPLICATION FILED AUG. 1, 1906.
3 SHEETS—SHEET 2.
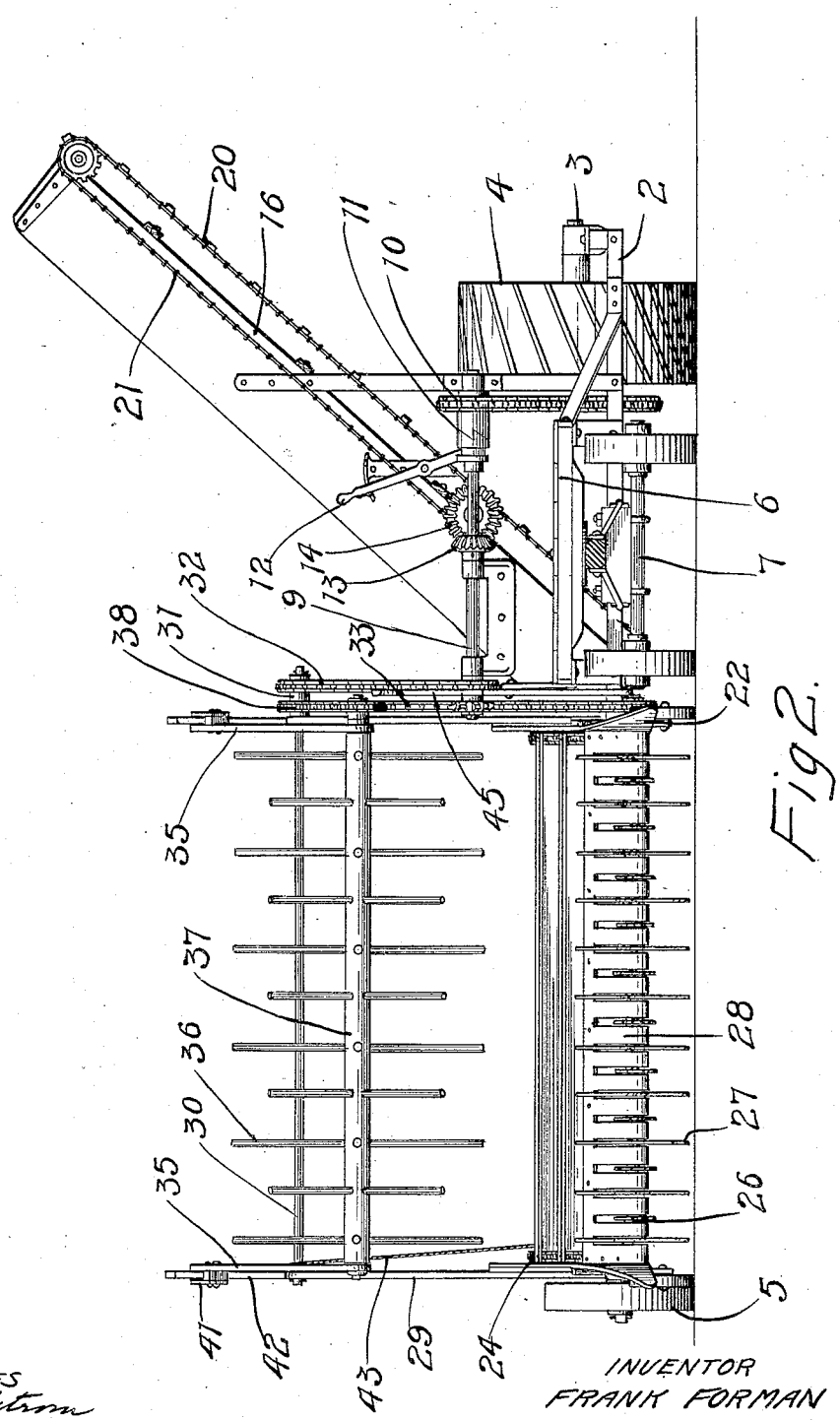
WITNESSES
INVENTOR
FRANK FORMAN
BY
HIS ATTORNEYS

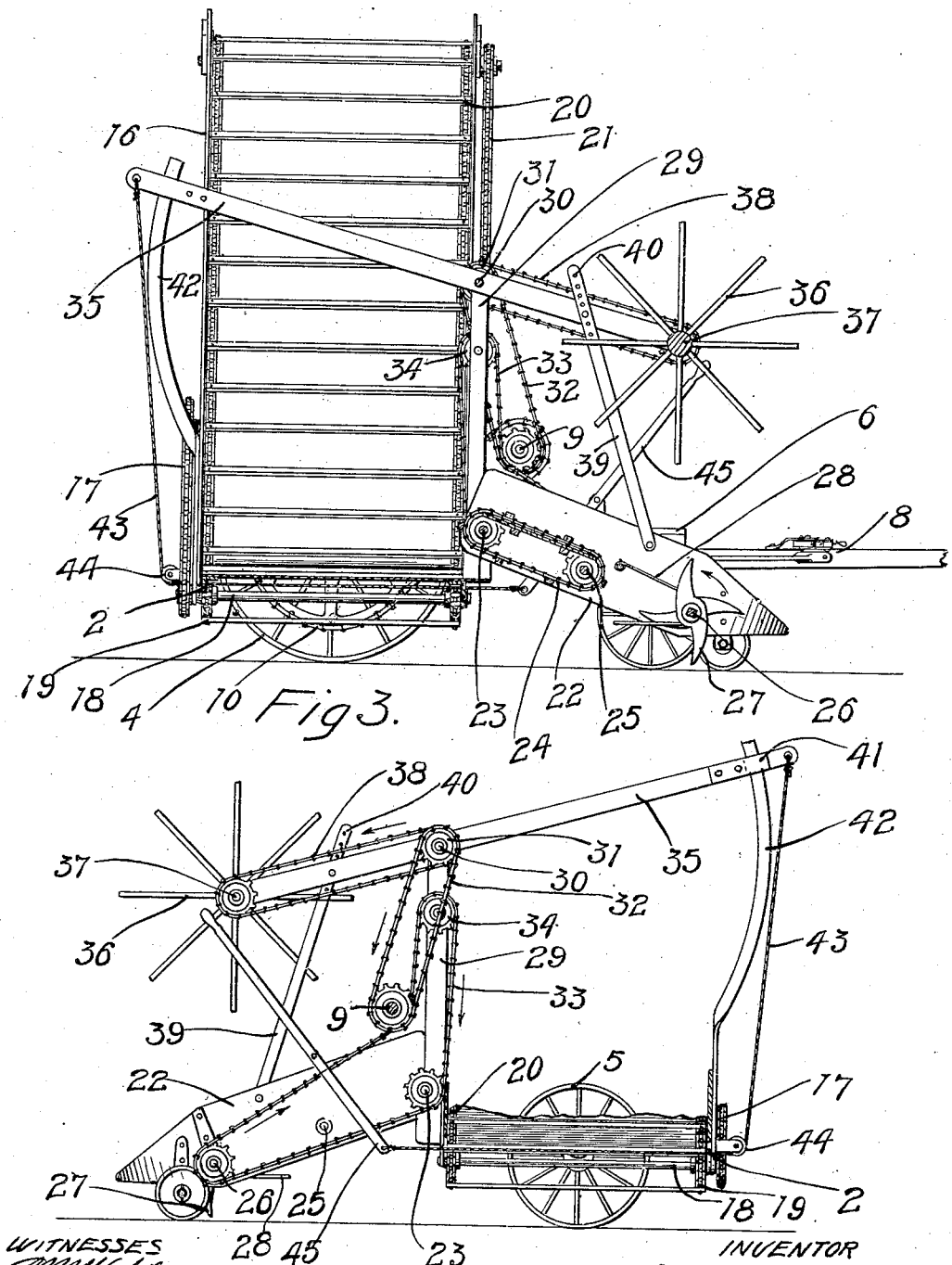

UNITED STATES PATENT OFFICE.

FRANK FORMAN, OF WAHPETON, NORTH DAKOTA.

SHOCK AND HAY LOADER.

No. 874,950.   Specification of Letters Patent.   Patented Dec. 31, 1907.

Application filed August 1, 1906. Serial No. 328,715.

*To all whom it may concern:*

Be it known that I, FRANK FORMAN, of Wahpeton, Richland county, North Dakota, have invented certain new and useful Improvements in Shock and Hay Loaders, of which the following is a specification.

The object of my invention is to provide a machine adapted to travel over the field and gather up shocks or bound bundles of grain and deliver them to a wagon or other receptacle.

A further object is to provide a machine designed primarily as a shock loader, but adapted also for loading hay.

The invention consists generally in various constructions and combinations, all as hereinafter described and particularly pointed out in the claims.

In the accompanying drawings forming part of this specification, Figure 1 is a plan view with parts broken away of a shock and hay loader embodying my invention. Fig. 2 is a front view of the same. Fig. 3 is a transverse sectional view showing the relative position of the gathering shoe and the reel. Fig. 4 is a similar view looking in the opposite direction and illustrating the means for driving the reel and gathering fingers.

In the drawings, 2 represents a frame having a shaft 3 at one end, provided with a traction wheel 4 and a carrying wheel 5 at the opposite end.

6 is a platform mounted on said frame near the traction wheel 4 and having a supporting truck 7 and a draft attachment 8. This platform, as indicated in Fig. 1 is arranged where the operator standing thereon can easily reach the different levers controlling the operative parts of the machine. In the rear of the platform 6 is a shaft 9 driven from the shaft 3 by a chain belt 10 and having a clutch 11 controlled by a lever 12 by means of which the operator can control the movement of the working parts of the machine. A gear 13 is mounted on the shaft 9 meshing with a similar gear 14 and on a shaft 15 which has bearings in an inclined frame 16. A chain belt 17 connects the shaft 15 with a shaft 18 for driving a horizontal carrier 19 which operates transversely to the direction of travel of the machine and delivers the material to an inclined carrier 20 operating in the frame 16 and driven by a chain belt 21 from the shaft 15. The carrier 20 is of suitable length to deliver the bound bundles into a wagon box or other receptacle.

A frame section 22 is hinged on the shaft 23 in front of the horizontal carrier and has a vertical movement on its pivot to accommodate itself to inequalities in the ground over which the machine is moving.

A carrier 24 operates over shafts 25 and 23 in said frame section to deliver the gathered material to the horizontal carrier. At the forward end of the frame section is a shaft 26 provided with a series of gathering fingers 27 operating through a sheet metal guard 28. These fingers are fast on the shaft and revolve in the direction indicated by the arrow and are adapted to pass in under the shocks of grain or the loose bound bundles and pick up the same and deliver them to the carrier 24 in the rear. Near the rear of the frame section on each side thereof, I provide upright standards 29 connected by a rod 30 whereon a double sprocket 31 is mounted. A chain 32 connects one of the sprockets on the said rod with the shaft 9 and a chain 33 extends from the shaft 9 around an idle sprocket 34 and from thence to the shafts 23 and 26, and whereby the carrier 24 and the gathering fingers 27 will be operated. Bars 35 are hinged on the rod 30 and overhang the frame section 22 and support a reel 36 mounted on a shaft 37 and driven by a chain belt 38 from the double sprocket 31. Links 39 pivotally connect the frame section 22 with the bars 35 and have a series of holes 40 whereby their connection with the bars 35 is rendered adjustable to permit the relative position of the frame section and the reel to be changed at will according to the character of the material the machine is gathering. The rear ends of the bars 35 are provided with guides 41 adapted to receive curved bars 42 mounted on the rear of the machine, see Figs. 3 and 4. A cable 43 is attached to the rear ends of the said bars 35 and extends under anti-friction pulleys 44 to an operating lever 45 located near the platform 6. The operator standing on the platform is thus able to raise or lower the gathering fingers and the reel supported above, at will and whenever desired the links 39 can be adjusted for the purpose of increasing or decreasing the distance between the reel and the frame section.

In operation the machine will be drawn over the field and the nose of the frame section will be adjusted close to the ground in position to allow the gathering fingers to pass beneath the shock or the bound bundles of grain and direct them over upon the carrier in the rear, from whence they will be delivered to the horizontal and inclined carrier sections and from thence to the receptacle. The revolving reel overhanging the bundles or shocks as they are gathered up will prevent them from toppling forward as they are engaged by the fingers and will have the effect of drawing the tops of the bundles or shocks backward and directing them into the machine. The machine may also be utilized for gathering up hay or straw.

I claim as my invention:

1. The combination, with a frame and its carrying wheels, of horizontal and inclined carrier belts operating transversely with respect to the draft line, a frame section hinged on said frame in front of said horizontal carrier belt, a carrier belt operating in said frame section parallel with the draft line, a series of revolving gathering fingers mounted in said frame section and arranged to pick up the bound bundles or shocks and deliver them to said belt, and a revolving reel located above said gathering fingers and adapted to engage the tops of the shocks or bundles and direct them backward upon said frame section substantially as described.

2. The combination, with a frame, having carrying wheels and belts operating transversely with respect to the draft line, a frame section hinged on said frame, a series of gathering fingers provided at the forward end of said frame section, a reel mounted above said frame section and adapted to engage the tops of the shocks or bound bundles and direct them backward into said frame section, and means connecting said frame section and reel, and whereby their simultaneous vertical movement is permitted, substantially as described.

3. The combination, with a frame having carrying wheels and a transversely operating belt, of a frame section, gathering fingers mounted in said frame section, bars pivotally supported above said frame section, a reel mounted in the forward ends of said bars over said gathering fingers, means for tilting said bars and adjustable connections provided between said bars and said frame section.

4. The combination, with a frame having carrying wheels, of a belt operating transversely therein, a frame section pivoted on said frame, gathering fingers mounted in the forward end of said frame section, upright standards provided near the rear of said frame section, a rod connecting said standards, bars mounted on said rod and projecting in the front and the rear of same, a reel mounted on the forward end of said bars and overhanging said fingers, and means for tilting said bars to raise and lower said reel, substantially as described.

5. The combination, with a frame having carrying wheels, and a transversely operating carrier belt, of a frame section pivoted in front of said belt, gathering fingers mounted in the forward end of said frame section, bars pivotally supported above said frame section, a reel mounted in the forward end of said bars and overhanging said frame section, links adjustably connecting said frame section and said bars, and whereby the distance between said reel and frame section can be changed and said frame section and reel moved vertically simultaneously and means for operating said bars.

6. The combination, with a frame having traction and carrying wheels and a horizontal carrier belt and an inclined elevator belt, a platform arranged in front of said elevator belt and having a draft attachment, a frame section hinged on said frame in front of said horizontal carrier belt, revolving gathering fingers provided at the forward end of said frame section, a reel hinged above said frame section and overhanging said fingers, and means within control of the operator standing on said platform for tilting said reel, substantially as described.

7. The combination, with a frame having traction and carrying wheels, and a horizontal carrier belt and an inclined elevator belt, of a platform located in front of said elevator belt and having a draft attachment, a frame section hinged in front of said horizontal carrier belt, revolving gathering fingers mounted in said frame section, a carrier belt mounted in said frame section in the rear of said fingers and operating in a direction parallel with the draft line, bars pivoted above said frame section and overhanging the same, a reel mounted in the forward ends of said bars, means connecting said bars and frame section, and means within control of the operator standing on said platform for tilting said bars to raise or lower said reel.

8. The combination, with a frame and carrying wheels, of a horizontal carrier belt operating transversely with respect to the draft line, a frame section hinged on said frame in front of said carrier belt, the forward portion of said frame section being out of contact with the ground, a series of revolving gathering fingers mounted in said frame section and operating below the forward portion of said frame section and arranged to pick up the bound bundles or shocks and deliver them to said belt, and a carrier operating between said fingers and said transversely operating belts and in a direction parallel substantially with the draft line.

9. The combination, with a frame having carrying wheels and a horizontal transversely operating carrier belt, of a frame section hinged on said frame, the forward portion of said frame section being out of contact with the ground revolving gathering fingers mounted in said frame section, and operating below the forward portion of said frame section to engage the bound bundles and direct them upon said frame section, and a reel supported above said fingers and arranged to engage the tops of the bundles and direct them toward said carrier belt.

10. The combination, with a frame having carrying wheels, of a transversely operating carrier belt, a frame section hinged in front of said belt, the forward portion of said frame section being out of contact with the ground, revolving gathering fingers mounted in said frame section, and operating below the forward portion of said frame section and a reel adjustably supported above said gathering fingers.

11. The combination, with a wheeled frame, of a transversely operating carrier therein, a frame section hinged in front of said carrier, the forward portion of said frame section being out of contact with the ground, revolving gathering fingers mounted in said frame section and adapted to gather up the bound bundles and direct them upon said carrier, said gathering fingers operating below the forward portion of said frame section and means for raising and lowering said frame section, substantially as described.

12. The combination, with a wheeled frame, of a transversely operating carrier therein, a frame section hinged in front of said carrier, the forward portion of said frame section being normally out of contact with the ground, means for adjusting the forward end or nose of said frame section vertically, and revolving gathering fingers mounted in said frame section and operating below the forward portion of said frame section.

13. The combination, with a frame having carrying wheels, of a transversely operating carrier belt, a frame section hinged in front of said belt, the forward portion of said frame section being normally out of contact with the ground, means for adjusting the forward end of said frame section vertically, and a series of gathering fingers mounted in said frame section and arranged to pick up the material and deliver it to said carrier belt and said fingers operating below the forward portion of said frame section.

14. The combination, with a frame having carrying wheels, of a transversely operating carrier, a frame section hinged in front of said carrier, the forward portion of said frame being normally out of contact with the ground, a second carrier operating in said frame section in a direction parallel with the draft line, a reel supported above said frame section, said reel having a vertical movement toward or from said frame section and the carrier operating therein, a platform provided in front of said transversely operating carrier, and mechanism for raising and lowering said reel from said platform.

In witness whereof, I have hereunto set my hand this 26th day of July 1906.

FRANK FORMAN.

Witnesses:
  C. J. KACHELHOFFER,
  GUSTAV SCHULER.